J. A. RANKIN.
NUT LOCK.
APPLICATION FILED MAY 26, 1909.
959,964.
Patented May 31, 1910.
Fig. 1.
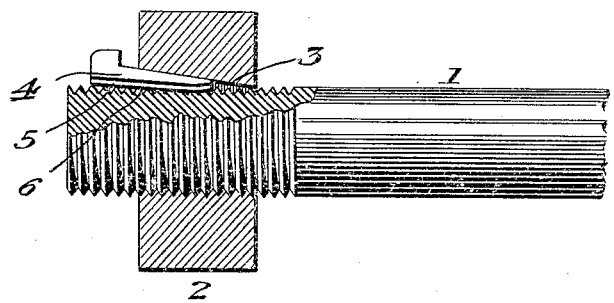
Fig. 2.
Fig. 3.
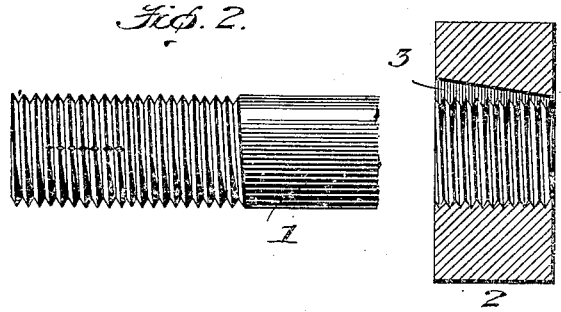
Fig. 4.
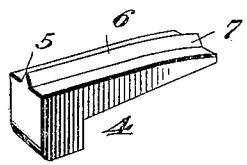
Fig. 5.
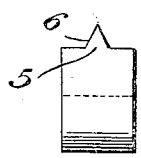
Witnesses
Inventor
Joseph A. Rankin
By Henry W. Copp
his Attorney

UNITED STATES PATENT OFFICE.

JOSEPH ANSLEY RANKIN, OF MILL CITY, OREGON.

NUT-LOCK.

959,964.   Specification of Letters Patent.   Patented May 31, 1910.

Application filed May 26, 1909. Serial No. 498,463.

*To all whom it may concern:*

Be it known that I, JOSEPH A. RANKIN, a citizen of the United States, residing at Mill City, county of Marion, and State of Oregon, have invented certain new and useful Improvements in Nut-Locks, of which the following is a specification.

My invention relates to nut locks.

The present invention has for its object the provision of a nut lock of simple and inexpensive construction, which will be readily adaptable to any nut and can be used in connection therewith on the bolt without requiring any change in the structure of the bolt or damaging the screw threads of either the bolt or nut and, further, to provide a device of this character which can be used to lock the nut without regard to the position thereof on the bolt and can also be removed at any time.

In carrying out the invention, I provide the nut with a seat or key-way extending crosswise of the screw threads and utilize a key of novel construction which is adapted to be driven into the seat after the nut has been tightened to the place where it will remain, the key being provided with a rib of novel form which is adapted to make a slight cut or indentation crosswise of the screw threads of the bolt, thereby securely locking the nut without damaging the screw threads of either the bolt or the nut and yet enabling the key to be withdrawn at any time when it is desired to release the nut.

The invention is set forth in detail hereinafter and the novel features are recited in the appended claim.

In the accompanying drawings:—Figure 1 is a partially sectional view showing the invention; Fig. 2, a view of the bolt showing how the threads are slightly cut crosswise by the key; Fig. 3, a sectional view of the nut, showing the key-seat; Fig. 4, a perspective view of the key; and Fig. 5, a view looking toward the head of the key.

The bolt is shown at 1 and the nut at 2. No modification in the structure of the bolt is necessary in order to carry out the invention, but the nut is provided with an inclined key-seat 3 extending crosswise of the threads thereof.

The key 4 is tapered so that it will exert a wedging action when inserted in the key-seat and is provided with a rib 5 having a more or less sharp ridge 6 which is sloped or beveled at its tip 7. The key is made of some suitably hard material, such as tempered steel so that the rib will readily cut across the screw threads of the bolt.

The nut having been screwed on the bolt to the desired extent, the key 4 is inserted in the seat and is driven home, the sloped part 7 of the rib enabling the rib to gradually take hold of the screw threads of the bolt as they are encountered, further movement of the key causing the ridge of the rib to cut across and make a slight notch in the screw threads of the bolt, thus securely locking the nut on the bolt, subject to subsequent release by withdrawing the key. The key damages neither the threads of the bolt or those of the nut or in any manner interferes with continued use of the bolt and nut and the key itself. One or more of the key-seats and keys may be used.

Having thus described my invention, what I claim as new and desire to secure by Letters Patent, is:—

In a nut lock, the combination with a nut and bolt, of a key-way or seat extending crosswise of the threads of one of them and having an inclined bottom, and a key adapted to fit said seat which in its original condition has a single raised cutting edge adapted to cut across the screw-threads and which is inclined at its extremity in relation to its general extent to facilitate its being driven across the screw-threads.

In testimony whereof, I hereunto affix my signature in presence of two witnesses.

JOSEPH ANSLEY RANKIN.

Witnesses:
C. A. BOLES,
CHAS. HOEDLE.